(12) United States Patent
Shinohara et al.

(10) Patent No.: US 11,943,645 B2
(45) Date of Patent: Mar. 26, 2024

(54) WIRELESS COMMUNICATION CHARACTERISTIC EVALUATION METHOD AND WIRELESS COMMUNICATION CHARACTERISTIC EVALUATION DEVICE

(71) Applicant: NIPPON TELEGRAPH AND TELEPHONE CORPORATION, Tokyo (JP)

(72) Inventors: Shoko Shinohara, Musashino (JP); Toshiro Nakahira, Musashino (JP); Yasuhiko Inoue, Musashino (JP); Hirantha Abeysekera, Musashino (JP); Koichi Ishihara, Musashino (JP); Takafumi Hayashi, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 200 days.

(21) Appl. No.: 17/600,522

(22) PCT Filed: Mar. 24, 2020

(86) PCT No.: PCT/JP2020/013136
§ 371 (c)(1),
(2) Date: Sep. 30, 2021

(87) PCT Pub. No.: WO2020/203499
PCT Pub. Date: Oct. 8, 2020

(65) Prior Publication Data
US 2022/0225137 A1 Jul. 14, 2022

(30) Foreign Application Priority Data
Apr. 2, 2019 (JP) ................................. 2019-070926

(51) Int. Cl.
*H04W 24/08* (2009.01)
*H04B 17/336* (2015.01)
*H04B 17/345* (2015.01)

(52) U.S. Cl.
CPC .......... *H04W 24/08* (2013.01); *H04B 17/336* (2015.01); *H04B 17/345* (2015.01)

(58) Field of Classification Search
CPC ..... H04W 24/08; H04W 24/02; H04W 24/00; H04W 24/10; H04W 16/22; H04W 16/04;
(Continued)

(56) References Cited

U.S. PATENT DOCUMENTS

2008/0081650 A1* 4/2008 Okamura ............... H04L 5/0007
455/500
2009/0207746 A1* 8/2009 Yuan .................... H04B 17/345
370/252
(Continued)

FOREIGN PATENT DOCUMENTS

CN 102224759 A * 10/2011 ............. H04L 5/001

OTHER PUBLICATIONS

Wang et al; A novel Mapping Criterion Scheme for MCS Selection in CDMA based HARQ Systems; IEEE; Dec, 1, 2005 (Year: 2005).*
(Continued)

*Primary Examiner* — Un C Cho
*Assistant Examiner* — Rasha K Fayed
(74) *Attorney, Agent, or Firm* — Harness, Dickey & Pierce, P.L.C.

(57) ABSTRACT

A wireless communication characteristics evaluation method for evaluating wireless communication characteristics of a wireless communication system where a plurality of wireless communication terminals perform communication by transmitting or exchanging signals, the wireless commu-
(Continued)

nication characteristics evaluation method including: a step 1 of acquiring power and a band of an interference signal; a step 2 of calculating an interference band rate showing a rate of the band of the interference signal that overlaps with a band of a desired signal; a step 3 of calculating an interference power rate from interference power and the interference band rate and furthermore, calculating steady noise power from the interference power and the interference power rate; a step 4 of determining a real SINR from received power of the desired signal and the steady noise power; and a step 5 of determining wireless communication characteristics of the desired signal from the real SINR.

3 Claims, 7 Drawing Sheets

(58) Field of Classification Search
CPC ..... H04W 16/14; H04W 16/18; H04W 16/24; H04W 84/12; H04W 84/02; H04W 84/18; H04W 52/243; H04W 52/06; H04W 72/082; H04W 72/085; H04W 72/0406; H04W 72/1205; H04W 28/02; H04W 28/04; H04W 88/08; H04W 88/06; H04W 92/20; H04B 1/006; H04B 1/0057; H04B 1/0064; H04B 1/401; H04B 1/44; H04B 17/336; H04B 17/345; H04B 7/00; H04B 7/024; H04B 7/0452; H04B 7/0465; H04B 7/0626; H04B 7/0639; H04B 7/0645; H04B 7/0404; H04B 7/0413; H04B 7/0604; H04B 7/0802; H04B 7/2606; H04B 7/1555
See application file for complete search history.

(56) References Cited

U.S. PATENT DOCUMENTS

| 2011/0211646 A1* | 9/2011 | Mashino | H04L 5/0037 375/260 |
| 2012/0087265 A1* | 4/2012 | Tamaki | H01Q 1/246 370/252 |
| 2013/0028309 A1* | 1/2013 | Park | H04L 1/0015 375/227 |
| 2013/0242933 A1* | 9/2013 | Fujimoto | H04W 72/542 370/329 |
| 2015/0333853 A1* | 11/2015 | Sawai | H04W 52/243 455/423 |
| 2016/0036542 A1* | 2/2016 | Gong | H04W 24/10 370/329 |
| 2016/0056891 A1* | 2/2016 | Chen | H04J 14/0227 398/26 |
| 2019/0089439 A1* | 3/2019 | Shimomura | H04B 17/336 |
| 2019/0190629 A1* | 6/2019 | Lin | H04W 24/02 |
| 2021/0021302 A1* | 1/2021 | Poletti | H04B 10/25751 |

OTHER PUBLICATIONS

The 802.11 Working Group of the LAN/MAN Standards Committee of the IEEE Computer Society, Part 11: Wireless LAN Medium Access Control (MAC) and Physical Layer (PHY) Specifications, IEEE Std 802.11-2016, IEEE Standard for Information technology—Telecommunications and information exchange between systems Local and metropolitan area networks—Specific requirements, Dec. 2016.

Ron Porat et al., 11ax Evaluation Methodology, IEEE P802.11 Wireless LANs, Jan. 21, 2016.

* cited by examiner

WIRELESS COMMUNICATION CHARACTERISTIC EVALUATION METHOD AND WIRELESS COMMUNICATION CHARACTERISTIC EVALUATION DEVICE

CROSS-REFERENCE TO RELATED APPLICATIONS

This application is a 371 U.S. National Phase of International Application No. PCT/JP2020/013136 filed on Mar. 24, 2020, which claims priority to Japanese Application No. 2019-070926 filed on Mar. 1, 2019. The entire disclosures of the above applications are incorporated herein by reference.

TECHNICAL FIELD

The present invention relates to a wireless communication characteristics evaluation method and a wireless communication characteristics evaluation device that evaluate wireless communication characteristics in an environment in which partial channel interference exists, in a wireless communication system where a plurality of wireless communication terminals perform wireless communication.

BACKGROUND ART

Since wireless LAN terminals that can be inexpensively used for a wireless LAN or the like have increased, a lot of wireless terminals are mixed in the same wireless communication area. These wireless LAN terminals can use a plurality of frequency bands, and they transmit wireless signals according to the rules specified for autonomous decentralized access control, which is specified in Non-Patent Literature 1. In the same area, however, wireless communication is sometimes performed while the wireless LAN terminals are interfering with one another.

In the environment in which a lot of wireless LAN terminals are mixed, there may be a case where wireless LAN terminals with different bandwidths are mixed or a case where wireless LAN terminals that interfere with one another because channels partially overlap are mixed. Such a situation is shown in FIG. 8.

Figure 8:
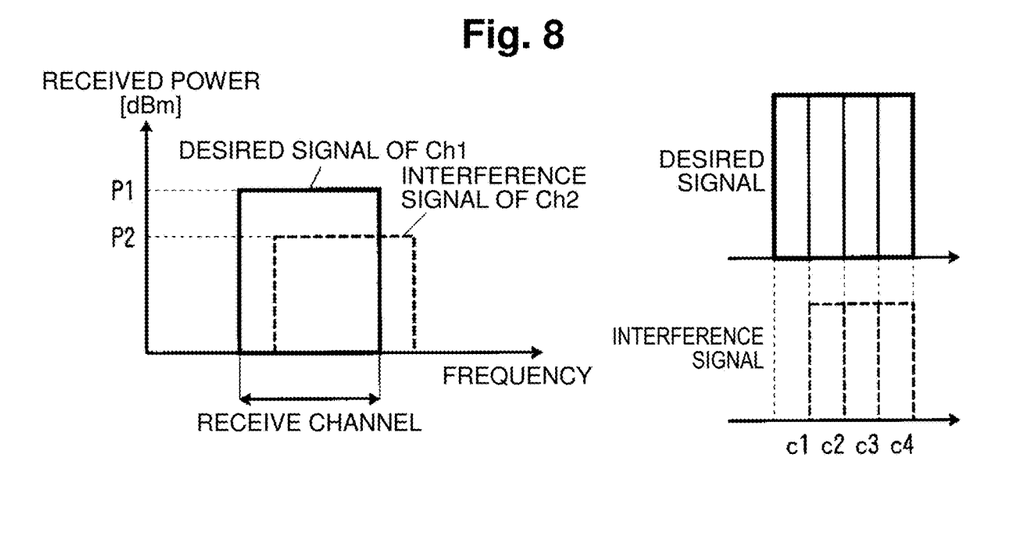
FIG. 8 is a diagram showing a relationship between a desired signal and an interference signal in a conventional example.

In FIG. 8, the horizontal axis indicates frequency and the vertical axis indicates power. When a desired wireless signal arrives at a receiving terminal through a channel 1 with a bandwidth of 20 MHz with power P1 [mW], an interference signal simultaneously arrives at a channel 2 deviated from the channel 1 by 5 MHz with P2 [mW]. In this case, it is possible to separate the desired wireless signal every 5 MHz into four blocks and compare received power of the desired wireless signal and received power of the interference signal within a range of the channel 1 to evaluate influence of interference.

Figure 9:
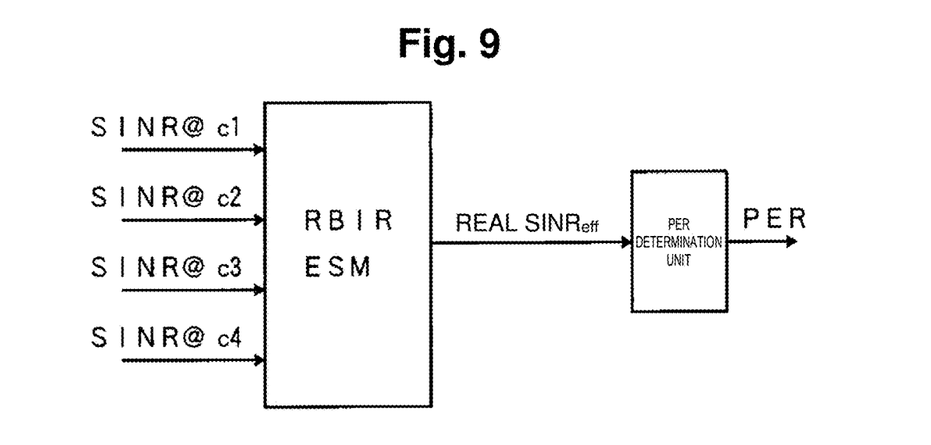
FIG. 9 is a diagram showing a calculation image of computer simulation in the conventional example.

FIG. 9 shows a calculation image for the four channel blocks.

In FIG. 9, after execution of SINR calculation for each of channel blocks c1 to c4, an effective number of bits is determined with a map function of each PBIR. After that, a real $SINR_{eff}$ is determined, and a PER (Packet Error Rate) is determined.

Figure 10:
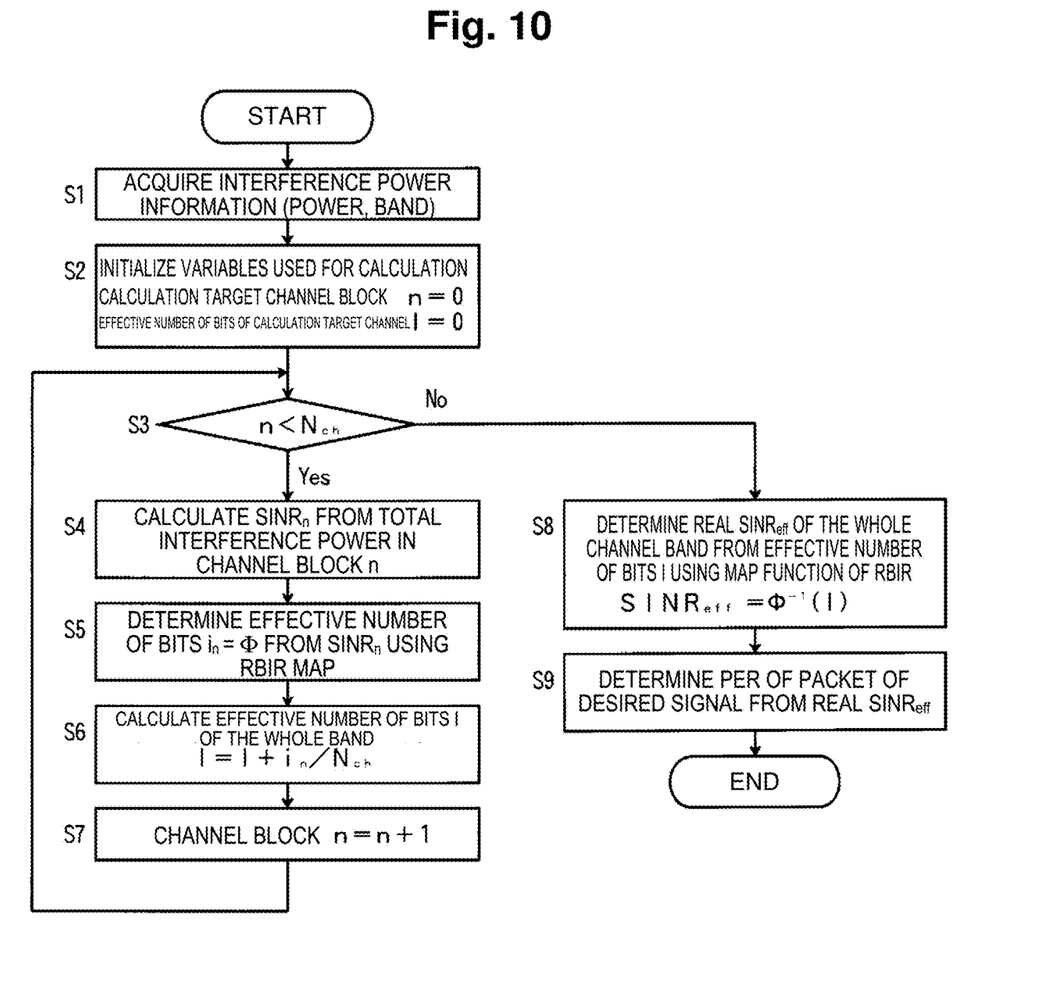
FIG. 10 is a diagram showing an interference calculation flow of the computer simulation in the conventional example.

FIG. 10 shows an interference calculation flow of computer simulation in a conventional example (Non-Patent Literature 2).

In FIG. 10, when interference calculation is started, interference power information such as a band for evaluating a desired signal, received power of the desired signal and power of an interference signal is acquired (S1). Next, variables used for the calculation are initialized (S2). In the present example, an index n of a calculation target channel block and an effective number of bits I of a calculation target channel are set to "0".

Next, it is confirmed whether the index n of the channel block is smaller than the number of channel blocks $N_{ch}$ (S3). If the index n is smaller, an $SINR_n$ is calculated from total interference power in the channel block n (S4). Here, SINR is an abbreviation of Signal to Interference Noise Ratio. From the calculated $SINR_n$, an effective number of bits $i_n=\Phi(SINR_n)$ of the channel block n is determined using a map function $\Phi$ of an RBIR (Received Bit Information Rate) (S5).

Next, the effective number of bits I of the whole band is calculated. Here, a value obtained by dividing the effective number of bits in by the number of channel blocks: $i_n/N_{ch}$ is added to the effective number of bits I of the calculation target channel (S6). Next, 1 is added to the index n of the channel block to obtain an index of the next channel block (S7). Next, the flow returns to S3, where calculation for the next channel block is executed if n is smaller than the number of channel blocks $N_{ch}$. Otherwise, a real $SINR_{eff}$ of the whole channel band=$\Phi^{-1}$(I) is determined from the effective number of bits I of the calculation target channel blocks, using the map function of the RBIR (S8). Here, the real $SINR_{eff}$ is an SINR value used when a PER (Packet Error Rate) is determined for the whole calculation target channel. Next, the PER of the desired signal is determined from data and the like prepared in advance, using the real $SINR_{eff}$ (S9).

CITATION LIST

Non-Patent Literature

Non-Patent Literature 1: "IEEE P802.11-2016," December 2016

Non-Patent Literature 2: "11ax Evaluation Methodology," doc.: IEEE802.11-14/0571r12, January 2016

SUMMARY OF THE INVENTION

Technical Problem

In an environment in which a lot of wireless terminals are mixed, there may be a case where interference occurs only in a partial frequency band in a channel used for transmission/reception as shown in FIG. 8. In the case of reproducing influence of the interference by computer simulation, it is necessary to calculate an apparent packet error rate by performing theoretical calculation described in Non-Patent Literature 2 for each block and adding up results thereof. Further, though, in the conventional calculation procedure, it is required to perform the calculation for each interference event (a timing when a PER of a desired signal has to be determined because there is a possibility that some interference has occurred against the desired signal), the calculation requires a lot of time and furthermore, it is thought to be insufficient to perform estimation only by the theoretical calculation in an actual environment.

An object of the present invention is to provide a wireless communication characteristics evaluation method and a wireless communication characteristics evaluation device capable of calculating influence of interference according to a real environment using data measured in the real environment and shortening calculation time in comparison with theoretical calculation.

Means for Solving the Problem

A first invention is a wireless communication characteristics evaluation method for evaluating wireless communication characteristics of a wireless communication system where a plurality of wireless communication terminals perform communication by transmitting or exchanging signals, the wireless communication characteristics evaluation method including: a step 1 of acquiring power and a band of an interference signal; a step 2 of calculating an interference band rate showing a rate of the band of the interference signal that overlaps with a band of a desired signal; a step 3 of calculating an interference power rate from interference power and the interference band rate and furthermore, calculating steady noise power from the interference power and the interference power rate; a step 4 of determining a real SINR from received power of the desired signal and the steady noise power; and a step 5 of determining wireless communication characteristics of the desired signal from the real SINR.

In the wireless communication characteristics evaluation method of the first invention, the step 3 acquires a modulation/demodulation scheme and a retransmission rate from packet capture data in a state in which there is interference at the interference band rate, calculates real interference power from an SINR corresponding to the retransmission rate in the case of performing transmission in the modulation/demodulation scheme, and calculates a ratio of the real interference power relative to actual interference power as the interference power rate.

In the wireless communication characteristics evaluation method of the first invention, the step 3 acquires a modulation/demodulation scheme from a throughput value in a state in which there is interference at the interference band rate, acquires an SINR at which transmission can be performed by the modulation/demodulation scheme from a datasheet, calculates real interference power from the SINR, and calculates a ratio of the real interference power relative to actual interference power as the interference power rate.

In the wireless communication characteristics evaluation method of the first invention, the step 3 acquires a corresponding SINR from a throughput value in a state in which there is interference at the interference band rate, from a datasheet, calculates real interference power from the SINR, and calculates a ratio of the real interference power relative to actual interference power as the interference power rate.

A second invention is a wireless communication characteristics evaluation method for evaluating wireless communication characteristics of a wireless communication system where a plurality of wireless communication terminals perform communication by transmitting or exchanging signals, the wireless communication characteristics evaluation method including: a step 11 of acquiring power and a band of an interference signal and calculating an interference band rate showing a rate of the band of the interference signal that overlaps with a band of a desired signal; a step 12 of determining steady noise power using interference power and a mapping function corresponding to the interference band rate; a step 13 of determining a real SINR from received power of the desired signal and the steady noise power; and a step 14 of determining wireless communication characteristics of the desired signal from the real SINR.

A third invention is a wireless communication characteristics evaluation device evaluating wireless communication characteristics of a wireless communication system where a plurality of wireless communication terminals perform communication by transmitting or exchanging signals, the wireless communication characteristics evaluation device including: an interference band rate calculation unit that acquires power and a band of an interference signal and calculates an interference band rate showing a rate of the band of the interference signal that overlaps with a band of a desired signal; a steady noise power calculation unit that calculates an interference power rate from interference power and the interference band rate and furthermore, calculates steady noise power from the interference power and the interference power rate; a real SINR calculation unit that determines a real SINR from received power of the desired signal and the steady noise power; and a wireless communication characteristics determination unit that determines wireless communication characteristics of the desired signal from the real SINR.

A fourth invention is a wireless communication characteristics evaluation device evaluating wireless communication characteristics of a wireless communication system where a plurality of wireless communication terminals perform communication by transmitting or exchanging signals, the wireless communication characteristics evaluation device including: an interference band rate calculation unit that acquires power and a band of an interference signal and calculates an interference band rate showing a rate of the band of the interference signal that overlaps with a band of a desired signal; a steady noise power mapping unit that determines steady noise power using interference power and a mapping function corresponding to the interference band rate; a real SINR calculation unit that determines a real SINR from received power of the desired signal and the steady noise power; and a wireless communication characteristics determination unit that determines wireless communication characteristics of the desired signal from the real SINR.

Effects of the Invention

In the present invention, communication quality deterioration due to partial channel interference is calculated by replacing the communication quality deterioration with noise of the whole channel, based on data obtained by experiments and measurement. The present invention is: (1) a method for calculating an amount of deterioration in a case where data obtained by experiments and measurements is replaced with noise of the whole channel; and (2) a method for utilizing the amount of deterioration obtained by the calculation, in computer simulation.

In the present invention, since an amount of interference is computed based on data measured in a real environment, evaluation of wireless communication characteristics that is more appropriate for a current environment becomes possible in comparison with the case of performing computing only with theoretical calculation. Further, since computer simulation of a wireless communication system is performed using numerical values calculated from data, it is possible to reduce an amount of calculation in comparison with the case of performing theoretical calculation each time.

DESCRIPTION OF EMBODIMENTS

Figure 1:
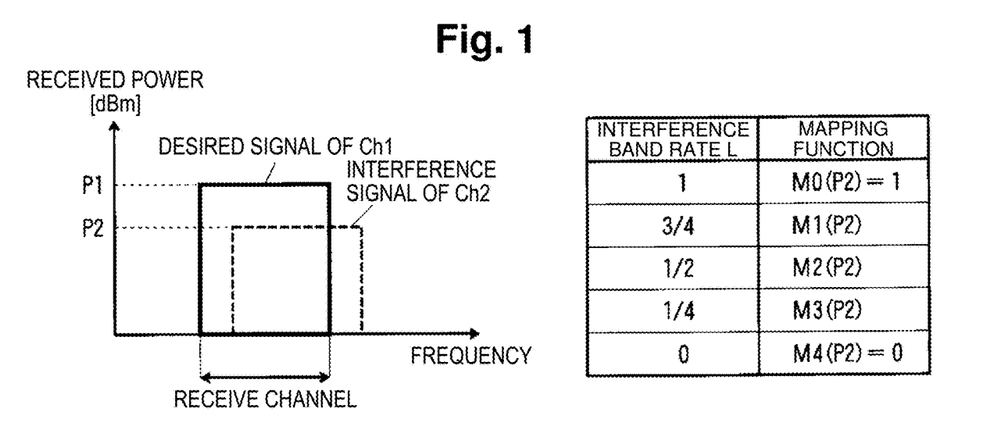
FIG. 1 is a diagram showing a relationship between a desired signal and an interference signal, and a relationship between an interference band rate and a mapping function.
Figure 2:
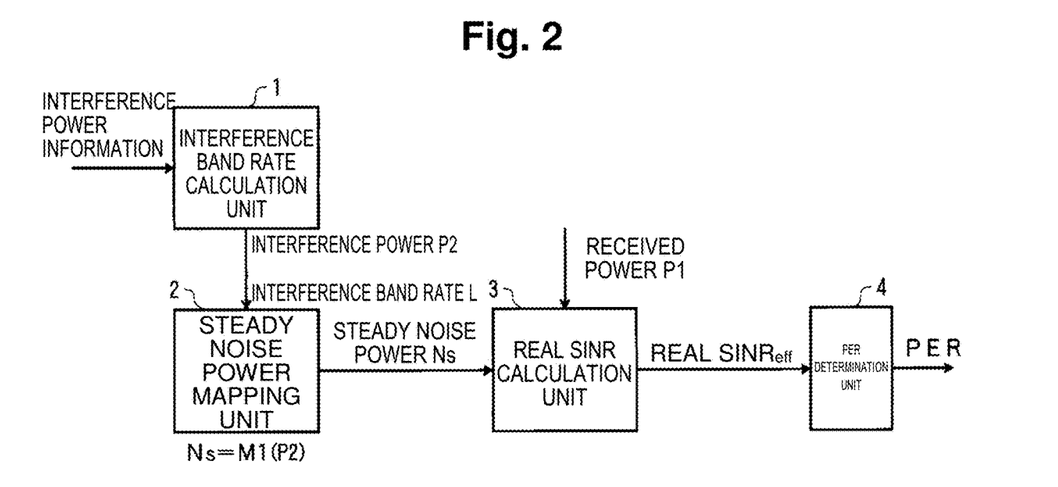
FIG. 2 is a diagram showing a configuration example of a wireless communication characteristics evaluation device of the present invention.

FIG. 1 shows a relationship between a desired signal and an interference signal, and a relationship between an interference band rate and a mapping function. FIG. 2 shows a configuration example of a wireless communication characteristics evaluation device of the present invention. FIGS. 1 and 2 correspond to FIGS. 8 and 9 shown as a conventional method.

In FIGS. 1 and 2, an interference band rate calculation unit 1 inputs interference power information such as power and a band of an interference signal to calculate an interference band rate L showing a rate of the band of the interference signal that overlaps with a band of a desired signal. Note that, if the interference band rate L is 1 when the interference signal completely overlaps with the whole channel band occupied by the desired signal, and 0 when the interference signal does not overlap at all, then L=¾ is satisfied in examples of FIGS. 1 and 8 because bands that the interference signal overlaps with are c2 to c4 among bands c1 to c4 of the desired signal.

A steady noise power mapping unit 2 specifies interference power P2 [dBm] and a mapping function corresponding to the interference band rate L. Since L=¾ is satisfied in the example of FIG. 1, a mapping function M1(P2) is used to convert the interference power P2 [dBm] to steady noise power Ns [dBm]. A real SINR calculation unit 3 determines a real $SINR_{eff}$ from this steady noise power Ns [dBm] and received power P1 [dBm] of the desired signal and furthermore, a PER determination unit 4 determines PER from the real $SINR_{eff}$. Note that it is assumed that the mapping function is created using measurement data in order to enhance calculation accuracy even in a simplified calculation method, which is the present invention.

Figure 3:
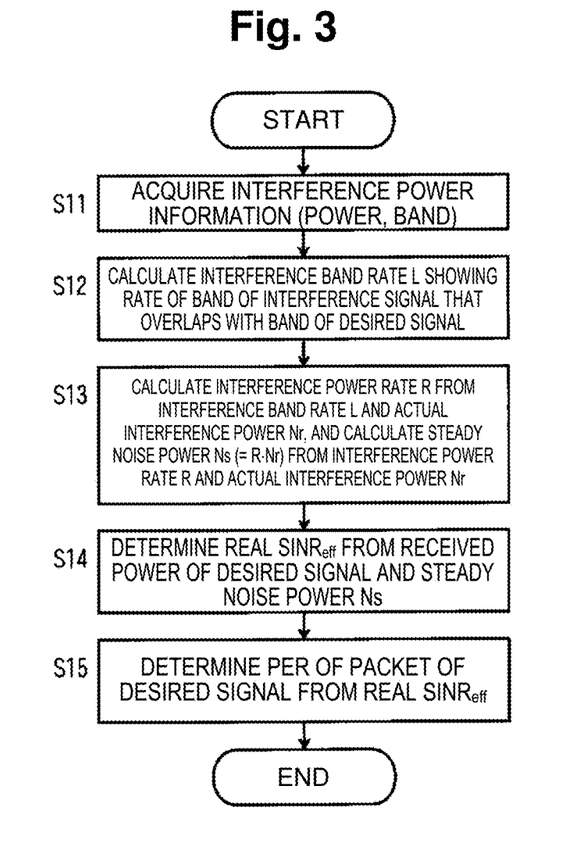
FIG. 3 is a diagram showing an interference calculation flow of a wireless communication characteristics evaluation method of the present invention.

FIG. 3 shows an interference calculation flow of the wireless communication characteristics evaluation method of the present invention.

In FIG. 3, when interference calculation is started, interference power information such as power and a band of an interference signal is acquired first (S11). Next, an interference band rate L, which is a rate of the band of the interference signal that overlaps with the channel band occupied by a desired signal, is calculated (S12).

Figure 4:
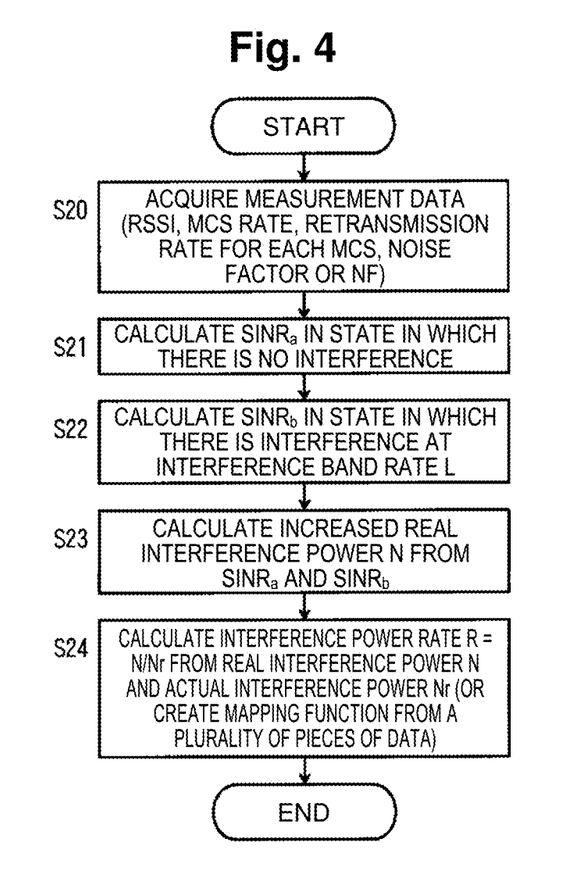
FIG. 4 is a diagram showing a first procedure for calculating an interference power rate R from measurement data.
Figure 5:
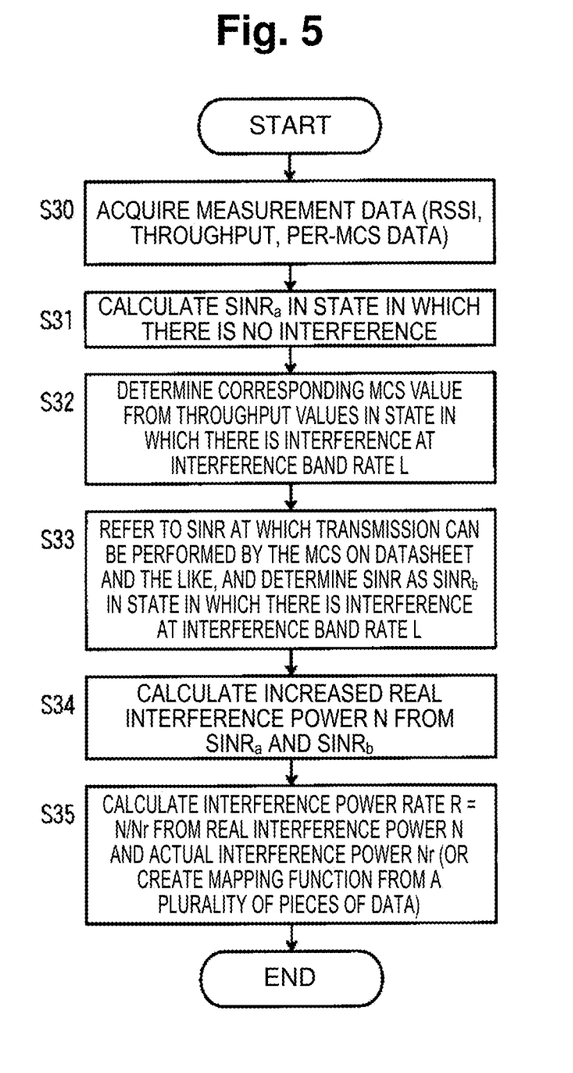
FIG. 5 is a diagram showing a second procedure for calculating the interference power rate R from measurement data.
Figure 6:
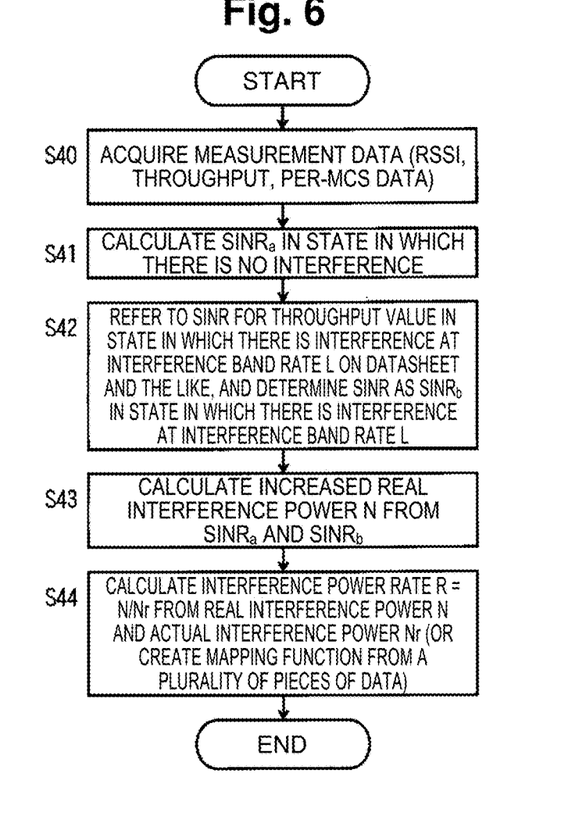
FIG. 6 is a diagram showing a third procedure for calculating the interference power rate R from measurement data.

Next, an interference power rate R is calculated from the interference band rate L and actual interference power Nr (P2 in the example of FIG. 1) based on data prepared in advance (details are shown in FIGS. 4 to 6), and furthermore, steady noise power Ns (=R·Nr) is calculated from the interference power rate R and the actual interference power Nr (S13). Note that, in the example of FIG. 2, the interference power Nr is changed to the steady noise power Ns using a mapping function corresponding to the interference band rate L instead of using the interference power rate R. Next, a real $SINR_{eff}$ is determined from received power of the desired signal and the steady noise power Ns calculated at S13 (S14). Next, a PER of a packet that the desired signal carries is determined from the real $SINR_{eff}$ (S15), and the interference calculation is ended.

Note that, since this interference calculation flow can significantly reduce the number of calculations through the whole computer simulation and furthermore, does not have to repeatedly perform calculation for each channel block, it is possible to simplify the calculation itself and reduce calculation costs. Therefore, the interference calculation flow is advantageous when calculation is executed each time an interference event occurs or when fixed values are used for prerequisites of computer simulation.

Three procedures for calculating the interference power rate R for calculating the steady noise power Ns from measurement data will be described below.

FIG. 4 shows a first procedure for calculating the interference power rate R from measurement data.

In FIG. 4, measurement data is acquired first (S20). Note that measurement data required for the present procedure is an RSSI, a modulation/demodulation scheme (hereinafter referred to as an MCS), a retransmission rate for each MCS, and a noise factor or an NF (Noise Floor) determined from the noise factor.

Next, an $SINR_a$ in a state in which there is no interference is calculated (S21). As a method for the calculation, for example, the following two methods are conceivable. (a) The $SINR_a$ in the state in which there is no interference is calculated from an RSSI in the state in which there is no interference and a noise factor of a receiving terminal. (b) A used MCS and a retransmission rate thereof are examined from packet capture data acquired in the state in which there is no interference; a PER in the MCS is checked; and a corresponding SINR is determined as the $SINR_a$ in the state in which there is no interference. Note that, in order to determine an SINR from a corresponding PER, map functions of the SINR and the PER and data shown in Non-Patent Literature 2 are used. Otherwise, an average value among SINRs examined by a plurality of MCSs or an expected value weighted by a frequency rate is calculated.

Next, an $SINR_b$ in a state in which there is interference at the interference band rate L is calculated (S22). As a method for the calculation, for example, the following method is conceivable. A used MCS and a retransmission rate thereof are acquired from packet capture data acquired in the state in which there is interference, and an SINR corresponding to a retransmission rate (PER) in a case where transmission is performed in the MCS is determined as the $SINR_b$ in the state in which there is interference. Note that, in order to determine an SINR from a corresponding PER, map functions of the SINR and the PER and data shown in Non-Patent Literature 2 are used. Otherwise, an average value among SINRs examined by a plurality of MCSs or an expected value weighted by a frequency rate is calculated.

Next, increased real interference power N is calculated from the two SINRs, the $SINR_a$ and the $SINR_b$ (S23). For example, if the $SINR_a$ without interference and the $SINR_b$ with interference are assumed as follows:

$SINR_a$: RSSI/NF $SINR_b$: RSSI/(NF+N)

then, the real interference power N is as follows:

$N=(SINR_a/SINR_b-1)\cdot NF$

Next, a ratio between the real interference power N and the actual interference power Nr (N/Nr) is calculated and set as the interference power rate R (S24). Otherwise, a mapping function may be created from a plurality of pieces of data. At S13 in FIG. 3, the steady noise power Ns=R·Nr is calculated from the interference power Nr and the interference power rate R.

FIG. 5 shows a second procedure for calculating the interference power rate R from measurement data.

In FIG. 5, measurement data is acquired first (S30). Note that measurement data required for the present procedure is an RSSI, a throughput, and PER-to-MCS data.

Next, an $SINR_a$ in the state in which there is no interference is calculated (S31). A method for the calculation is the same as S21 shown in FIG. 3.

Next, a corresponding MCS is determined from throughput values in the state in which there is interference at the interference band rate L (S32). Here, throughput values when transmission is performed by MCSs are kept as data, and a value that is the closest to a measured value, or the closest value among values higher/lower than the measured value is selected.

Next, an SINR at which transmission can be performed by the MCS is referred to on the datasheet and the like, and the SINR is determined as an $SINR_b$ in the state in which there is interference at the interference band rate L (S33). Here, for example, such an SINR that the PER is below a predetermined value may be specified, or one value among SINRs at which it is thought that the transmission can be performed by the MCS, such as an intermediate value between such an SINR that the PER is below a predetermined value ($sinr_l$) and such an SINR that the PER is below the predetermined value in an MCS higher than the above MCS by one ($sinr_u$), can be determined.

Next, increased real interference power N is calculated from the two SINRs, the $SINR_a$ and the $SINR_b$ (S34). This process is the same as that of S23 shown in FIG. 4.

Next, a ratio between the real interference power N and the actual interference power Nr (N/Nr) is calculated and set as the interference power rate R (S35). Otherwise, a mapping function may be created from a plurality of pieces of data. This process is the same as that of S24 shown in FIG. 4.

FIG. 6 shows a third procedure for calculating the interference power rate R from measurement data.

In FIG. 6, measurement data is acquired first (S40). Note that measurement data required for the present procedure is an RSSI, a throughput, and PER-to-MCS data.

Next, an $SINR_a$ in the state in which there is no interference is calculated (S41). A method for the calculation is the same as S21 shown in FIG. 3.

Figure 7:
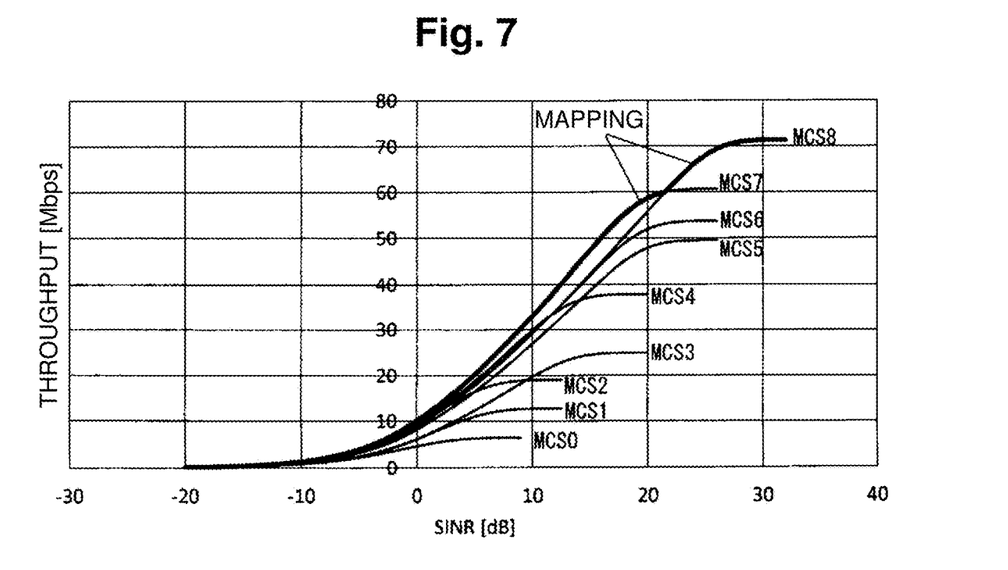
FIG. 7 is a diagram showing a relationship between theoretical calculation of throughput and an SINR in the case of IEEE802.11ac (20 MHz, 1 ss).

Next, an SINR for a throughput value in the state in which there is interference at the interference band rate L is referred to on the datasheet and the like, and the SINR is determined as an $SINR_b$ in the state in which there is interference at the interference band rate L (S42). From SINR-to-throughput data or the like obtained by theoretical calculation, computer simulation, or pre-measurement, throughputs and SINRs are mapped and made into a datasheet, and the $SINR_b$ in the state in which there is interference is selected from the datasheet. FIG. 7 shows a graph example of the SINR-to-throughput data. FIG. 7 shows a relationship between theoretical calculation of throughput and an SINR in the case of IEEE802.11ac (20 MHz, 1 ss) as a graph. For each SINR, an MCS having the largest throughput can be mapped one to one as shown by thick lines.

Next, increased real interference power N is calculated from the two SINRs, the $SINR_a$ and the $SINR_b$ (S43). This process is the same as that of S23 shown in FIG. 4.

Next, a ratio between the real interference power N and the actual interference power Nr (N/Nr) is calculated and set as the interference power rate R (S44). Otherwise, a mapping function may be created from a plurality of pieces of data. This process is the same as that of S24 shown in FIG. 4.

REFERENCE SIGNS LIST

1 Interference band rate calculation unit
2 Steady noise power mapping unit
3 Real SINR calculation unit
4 PER determination unit

The invention claimed is:

1. A wireless communication characteristics evaluation method for evaluating wireless communication characteristics of a wireless communication system where a plurality of wireless communication terminals perform communication by transmitting or exchanging signals, the wireless communication characteristics evaluation method comprising: a step 1 of measuring power and a band of an interference signal; a step 2 of calculating an interference band rate using the measured interference power, where the interference band rate indicates a quantity of overlap between the band of the interference signal and a band of a desired signal; a step 3 of calculating an interference power rate, and calculating steady noise power from the interference power and the interference power rate; a step 4 of determining a real SINR from received power of the desired signal and the steady noise power; and a step 5 of determining wireless communication characteristics of the desired signal from the real SINR; wherein the interference power rate is calculated by acquiring a modulation/demodulation scheme and a retransmission rate from packet capture data in a state in which there is interference at the interference band rate, calculating real interference power from an SINR corresponding to the retransmission rate in the case of performing transmission in the modulation/demodulation scheme, and setting the interference power rate to a ratio of the real interference power relative to the measured interference power.

2. A wireless communication characteristics evaluation method for evaluating wireless communication characteristics of a wireless communication system where a plurality of wireless communication terminals perform communication by transmitting or exchanging signals, the wireless communication characteristics evaluation method comprising: a step 1 of measuring power and a band of an interference signal; a step 2 of calculating an interference band rate using the measured interference power, where the interference band rate indicates a quantity of overlap between the band of the interference signal and a band of a desired signal; a step 3 of calculating an interference power rate from interference power and the interference band rate and furthermore, and calculating steady noise power from the interference power and the interference power rate; a step 4 of determining a real SINR from received power of the desired signal and the steady noise power; and a step 5 of determining wireless communication characteristics of the desired signal from the real SINR; wherein the interference power rate is calculated by acquiring-a modulation/demodulation scheme from a throughput value in a state in which there is interference at the interference band rate, acquiring an SINR at which transmission can be performed by the modulation/demodulation scheme from a datasheet, calculating real interference power from the SINR, and calculating a ratio of the real interference power relative to actual interference power as the interference power rate.

3. A wireless communication characteristics evaluation method for evaluating wireless communication characteristics of a wireless communication system where a plurality of wireless communication terminals perform communication by transmitting or exchanging signals, the wireless communication characteristics evaluation method comprising: a step 1 of measuring power and a band of an interference signal; a step 2 of calculating an interference band rate using the measured interference power, where the interference band rate indicates a quantity of overlap between the band of the interference signal and a band of a desired signal; a step 3 of calculating an interference power rate from interference power and the interference band rate and furthermore, and calculating steady noise power from the interference power and the interference power rate; a step 4 of determining a real SINR from received power of the desired signal and the steady noise power; and a step 5 of determining wireless communication characteristics of the desired signal from the real SINR; wherein the interference power rate is calculated by acquiring-a corresponding SINR from a throughput value in a state in which there is interference at the interference band rate, from a datasheet, calculating-real interference power from the SINR, and calculating a ratio of the real interference power relative to actual interference power as the interference power rate.

* * * * *